United States Patent
Wolfram et al.

(10) Patent No.: US 10,951,568 B2
(45) Date of Patent: Mar. 16, 2021

(54) METHODS AND SYSTEMS FOR PROCESSING ELECTRONIC MESSAGES

(71) Applicant: Wolfram Research, Inc., Champaign, IL (US)

(72) Inventors: Stephen Wolfram, Concord, MA (US); Robert L. Sandheinrich, St. Louis, MO (US); Christopher M. Smith, Savoy, IL (US)

(73) Assignee: Wolfram Research, Inc., Champaign, IL (US)

( * ) Notice: Subject to any disclaimer, the term of this patent is extended or adjusted under 35 U.S.C. 154(b) by 488 days.

(21) Appl. No.: 15/384,037

(22) Filed: Dec. 19, 2016

(65) Prior Publication Data

US 2017/0180291 A1 Jun. 22, 2017

Related U.S. Application Data

(60) Provisional application No. 62/269,079, filed on Dec. 17, 2015.

(51) Int. Cl.
*H04L 12/58* (2006.01)
(52) U.S. Cl.
CPC .................... *H04L 51/18* (2013.01)
(58) Field of Classification Search
CPC ......... H04L 51/18; H04L 51/02; H04L 51/24; H04L 51/063; H04L 51/046
See application file for complete search history.

(56) References Cited

U.S. PATENT DOCUMENTS

| | | | | |
|---|---|---|---|---|
| 6,081,832 A | * | 6/2000 | Gilchrist | G06Q 10/107 709/206 |
| 6,105,056 A | * | 8/2000 | Gilchrist | G06Q 10/107 709/206 |
| 6,487,583 B1 | * | 11/2002 | Harvey | A63F 13/12 709/204 |
| 6,944,851 B1 | * | 9/2005 | Dixon, III | G06F 8/36 717/108 |
| 8,589,869 B2 | | 11/2013 | Wolfram | |
| 2010/0332456 A1 | * | 12/2010 | Prahlad | G06F 16/1844 707/664 |
| 2013/0125094 A1 | | 5/2013 | Wolfram et al. | |
| 2015/0154012 A1 | | 6/2015 | Wolfram | |
| 2016/0026438 A1 | | 1/2016 | Wolfram | |

* cited by examiner

*Primary Examiner* — David R Lazaro
*Assistant Examiner* — Zia Khurshid
(74) *Attorney, Agent, or Firm* — Faegre Drinker Biddle & Reath LLP

(57) ABSTRACT

Programmer input in a programming language in received, where the programmer input defines a behavior of an executable electronic object. One or more computers generate the executable electronic object according to the programmer input. An electronic message corresponding to invoking the executable electronic object is received, and in response to receiving the electronic message, the executable electronic object is invoked by one or more computers.

15 Claims, 10 Drawing Sheets

In[1]:= func = If[! StringFreeQ[#Body, "table", IgnoreCase->True],
       SendMail[{#From <> " mentioned a table",
       "Here is the message :\n" <> #Body}]]

In[2]:= MailReceiverFunction[func][File["ExampleData/in.mbox"]]

In[1]:= getPrices[subject_, body_] := StringCases[subject <> " " <> body,
       "$" ~~ (DigitCharacter ..)]
In[2]:= func = If[! StringFreeQ[#Body, "table", IgnoreCase->True],
       PutAppend[<| "Seller" -> #From, "Prices" -> getPrices[#Subject, #Body],
       "Date" -> Now, "Message" -> #Body, "Pictures" -> #Attachments|>,
       "TablesForSale"]
       ] &;

In[3]:= MailReceiverFunction[func][File["ExampleData/in.mbox"]]

```
dataset = Dataset[CloudEvaluate[ReadList["TablesForSale"]]];
dataset[All, {"Prices", "Date"}]
```

| Prices | Date |
|---|---|
| {$20} | 30 Jun 2015 09:24:25 |
| {$10, $10} | 30 Jun 2015 09:28:16 |
| {$300, $500} | 30 Jun 2015 09:33:20 |
| {$50} | 30 Jun 2015 09:51:05 |
| {$100, $100} | 30 Jun 2015 09:53:15 |
| {$30, $60} | 30 Jun 2015 10:02:19 |
| 2 cols | 6 rows |

← 308

In[1]:= CloudDeploy[APIFunction[{"name"->"Country", GeoGraphics[Polygon[#country]] &, "PNG"]]

Out[1]:= CloudObject[https://www.wolframcloud.com/objects/d9263a7-f6a3-499e-bca0-b28a27ddb83c]

FIG. 10

In[1]:= getPrices[subject_, body_] := StringCases[subject <> " " <> body,
        "$" ~~ (DigitCharacter ..)]
In[2]:= func = If[! StringFreeQ[#Body, "table", IgnoreCase->True],
        PutAppend[<| "Seller" -> #From, "Prices" -> getPrices[#Subject, #Body],
        "Date" -> Now, "Message" -> #Body, "Pictures" -> #Attachments|>,
        "TablesForSale"]
        ] &

In[3]:= CloudDeploy[MailReceiverFunction[func]]

Out[3]:= CloudObject[mailto: receiver+6h33MsTu@wolframcloud.com]

FIG. 11

In[1]:= func = SendMail[#From<> " sent your receiver mail about " <> #Subject] &
In[2]:= CloudDeploy[MailReceiverFunction[func]]

Out[2]:= CloudObject[mailto: receiver+5i21LEhA@wolframcloud.com]

METHODS AND SYSTEMS FOR PROCESSING ELECTRONIC MESSAGES

CROSS-REFERENCE TO RELATED APPLICATION

The present application claims the benefit of U.S. Provisional Application No. 62/269,079, filed on Dec. 17, 2015, entitled "Methods and Systems for Email Receiver Function," which is hereby incorporated by reference herein in its entirety.

FIELD OF THE DISCLOSURE

The present disclosure generally relates to methods and systems for processing email messages, and more particularly to methods and systems that perform defined functions in response to received email messages.

BACKGROUND

As email communications have rapidly increased in use, efficiently dealing with large quantities of received email messages has become a problem. Often, email inboxes can have thousands, tens of thousands, or hundreds of thousands or more unread email messages collected over time because the email messages are received more rapidly than a person or even a group of people can read and process them.

Existing mechanisms to deal with this problem include creating rules to place email messages into folders according to the email addresses from which the messages originated, keywords contained within the messages or subject fields, or specific email addresses to which the email messages were addressed or from which the email messages originated. However, these mechanisms do not effectively process the email messages, but rather simply categorize the email messages for later handling and processing.

SUMMARY OF THE DISCLOSURE

In one embodiment, a method for performing a function according to a received email message comprises receiving, at one or more computers, an email message corresponding to invoking an executable electronic object, and in response to receiving the email message, invoking the executable electronic object by the one or more computers.

In another embodiment, a method for cloud deployment includes receiving, at one or more computers, programmer input in a programming language, the programmer input including i) a built-in function corresponding to making electronic objects accessible on a network, and ii) a parameter indicating an electronic object; and evaluating, at one or more computers, the programmer input to cause the electronic object to be stored on a server and made accessible via a network coupled to the server, where the function is invoked by the server receiving an email message via the network.

In yet another embodiment, a system for cloud deployment comprises one or more processors; and one or more memory devices coupled to the one or more processors, the one or more memories storing machine readable instructions that, when executed by the one or more processors, cause the one or more processors to: receive programmer input in a programming language, the programmer input including i) a built-in function corresponding to making electronic objects accessible on a network, and ii) a parameter indicating an electronic object, and evaluate the programmer input to cause the electronic object to be stored on a server and made accessible via a network coupled to the server, where the function is invoked by the server receiving an email message via the network.

In still another embodiment, a method for cloud deployment comprises in response to an evaluation of programmer input in a programming language, the programmer input including i) a built-in function corresponding to making electronic objects accessible on a network, and ii) a parameter indicating an electronic object, storing the electronic object on a database system coupled to a server, making the stored electronic object accessible via a network coupled to the server, and providing, at one or more computers, a handle to the electronic object to enable accessing the electronic object via the network, where the function is invoked by the server receiving an email message via the network.

In a further embodiment, a system comprises one or more processors; and one or more memory devices coupled to the one or more processors, the one or more memories storing machine readable instructions that, when executed by the one or more processors, cause the one or more processors to: in response to an evaluation of programmer input in a programming language, the programmer input including i) a built-in function corresponding to making electronic objects accessible on a network, and ii) a parameter indicating an electronic object, store the electronic object on a database system coupled to a server, make the stored electronic object accessible via a network coupled to the server, and provide a handle to the electronic object to enable accessing the electronic object via the network, where the function is invoked by the server receiving an email message via the network.

BRIEF DESCRIPTION OF THE DRAWINGS

FIG. 2 illustrates example programmer input entered into a workspace of a computational application, the programmer input for evaluating emails, according to an embodiment.

FIG. 3A illustrates example programmer input entered into a workspace of a computational application, the programmer input for evaluating emails, according to an embodiment.

FIG. 3B illustrates example programmer input and resulting output in a workspace of a computational application, the programmer input for viewing results of email processing, according to an embodiment.

FIG. 10 illustrates example programmer input and resulting output in a workspace of a computational application, the programmer input for creating a function to evaluate emails and deploying the function to network accessible storage, according to an embodiment.

FIG. 11 illustrates example programmer input and resulting output in a workspace of a computational application, the programmer input for creating a function to evaluate emails and deploying the function to network accessible storage, according to an embodiment.

DETAILED DESCRIPTION

Figure 1:
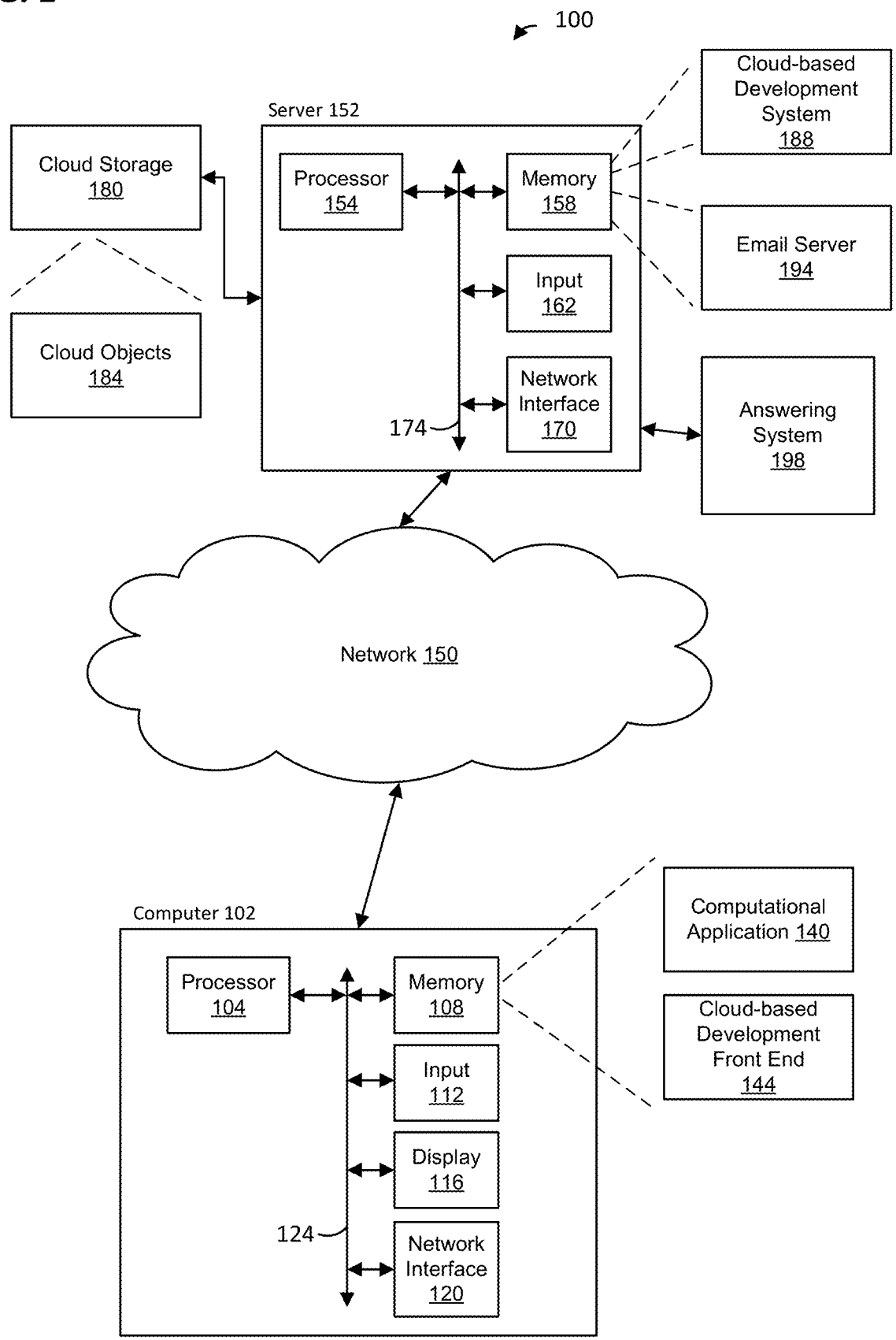
FIG. 1 is a diagram of an example system for cloud-based development system, according to an embodiment.

In some embodiments described below, a computational application provides tools that enable sophisticated and complex processing and/or analysis of email messages or other electronic messages. For instance, in various embodiments, the computational application may be configured to evaluate programming input in a programming language, wherein the programming language includes many built-in functions for performing many types of mathematical computations and/or data processing analyses. In some embodiments, the computation application and/or the programming language enables the performance of linguistic analyses and/or natural language processing techniques on natural language text, such as in the subject line of an email, the body of an email, etc. In some embodiments, a programmer may define a function to be applied to email data by entering programming input into a notebook, workspace, etc., of the computational application. In some embodiments, the programmer input may include built-in functions of the programming language. In some embodiments, the function defined by the programmer input can be deployed to a network accessible server system, and the function can be invoked by sending email to the deployed function; the deployed function then processes the email.

In an embodiment, a computer system receives an email message and processes the email message by reading the content of the email message, email message subject line, email message address fields, one or more documents or files attached to the email message, and/or meta data included with the email message, and performing an action according to the read content. In an example, the computer system may parse the email message, use a contextual analysis system or an artificial intelligence system to analyze and/or understand the content of the email message and then draft a response to the sender of the email message, and then send the response to the sender of the email message. The response may be an answer to a query in the received email message, or acknowledgment of performing a function according to the received email message, for example. The contextual analysis system or artificial intelligence system may also analyze other messages in a folder of previously received email messages from the same sender to assist in understanding the content of the email message. In this embodiment, the contextual analysis system or artificial intelligence system may generate an automated response to a sender of a received email message. In other embodiments, the automated response may be sent to a third party rather than the sender of the received email message. The email address of the third party may be determined a priori, according to the content of the received email message, or according to an algorithm involving at least one of these two.

In an example, one or more attachments of an email message may be processed according to the type of attachment, the email address to which the attachment was sent, a keyword or identification code included in the email message, or subject matter of the email message ascertained via a contextual analysis of the email message. A document received as an attachment may be converted from one format to another, e.g., from a word processing text document to a PDF document, from a comma separated value (CSV) document to a spreadsheet document, from an HTML document into a pure text document, etc. The document received as an attachment may be analyzed and reformatted to be easier to understand by a user. The document received as an attachment may also be transmitted to a third party via another medium, e.g., printed and mailed or faxed. When multiple documents are received, they may be collected and converted into a single document that incorporates the information from the multiple documents.

In another illustrative example, an online computer system receives email messages, from subscribers to the online computer system, reporting that subscribers are unable to log into the online computer system. The online computer system may automatically deactivate subscriber accounts and their associated access to the online computer system when suspicious activity or potentially fraudulent activity is detected. This potentially fraudulent activity may include an unusually high frequency of queries to the online computer system originating from a same IP address within a given period of time. Frequently, such potentially fraudulent activity is actually benign, but appears fraudulent to the online computer system because of unusual circumstances associated with the subscriber. For example, the subscriber may be one of many subscribers that access the online computer system through a firewall that causes all of the many subscribers to appear to be accessing the online computer system from a same IP address, when in fact they are all originating from different IP addresses in the local area network behind the firewall. The online computer system may only see the firewall's IP address as the originating IP address for all of the many subscribers that are accessing the online computer system from behind the firewall. As a result, the online computer system may deactivate all subscribers that access the online computer system from the IP address of the firewall. This may be a common occurrence for universities and other educational institutions that often employ firewalls between the institution and the public Internet. Therefore, when the online computer system processes email messages reporting problems logging into the online computer system, the email addresses from which the email messages are sent may be analyzed to determine whether they originate from a university or educational institution. If they do, the online computer system may automatically reactivate the online account associated with the email addresses from which the email messages reporting the online computer system access problem were received.

In other examples, a deactivated subscriber may be a legitimate heavy user of the online computer system or have a sticky keyboard that causes numerous unintended accesses of the online computer system to be repeatedly made. The online computer system may process the email message received from the subscriber reporting problems logging into the online computer system automatically in a similar fashion as described above.

The automatic mail processing may be performed not only on email messages as they are received, but additionally or alternatively on email messages that are stored in an email message file. For example, email messages received may be stored into an email message file or folder according to a rule in an email program such as THUNDERBIRD®. The automatic mail processing may be activated by a user or a script to process all messages or selected messages collected together in an email file or folder at any given time after the messages are received and collected in the file or folder. The selected messages may include those manually selected by a user out of a list of email messages or all email messages within a folder or group of folders that include a specified keyword or ID embedded within them.

As another illustrative example, when a user is reading an email message using an email program or using a web browser communicating with an online computer system, the email program or online computer system may analyze the content of the email message or messages being read and show the user additional content related to the content of the email. The additional content may be shown in another window on the user's computer system, or in another area of the window being used to read the email message. The additional content may include advertisements selected based on keywords or subject matter of the analyzed email message being read. The additional content may also include other email messages previously received by the user that are related in some way to the analyzed email message. A contextual analysis may be used to determine whether there is a relationship between the additional content and the analyzed email message. The additional content may include any other information available to the user's computer locally or through an online connection, including Wikipedia entries, web pages, social media account information, photographs, videos, audio recordings, and written documents.

For example, the additional content may be an email message sent by or to a same user that is also a sender or recipient of the analyzed email message. The additional content may include a same keyword as the analyzed email message, or include some common or related subject matter as the analyzed email message. The additional content may include other communications between the user and the sender or recipient of the analyzed email message, including social media communications, e.g., FACEBOOK® posts or TWITTER® posts, and written correspondence in the form of electronic documents. The additional content may also include past or future calendar appointments involving the sender or recipient of the analyzed email message.

As another example, a publicly traded company may be mentioned in the analyzed email message. A popup window may then be launched on the user's computer system that shows the current stock price, Wikipedia entries, and/or other public information about the company mentioned in the analyzed email message. The popup window may also show aspects of the user's previous experience with the mentioned company, such as prior purchases from the mentioned company, prior correspondence with the mentioned company, and/or prior or upcoming calendar appointments involving the mentioned company.

FIG. 1 is a diagram of an example system 100 for processing emails, according to an embodiment. In some embodiments, the system 100 also enables one or more of creating cloud objects, deploying objects to a cloud server system, and/or utilizing cloud services provided by the cloud server system, according to an embodiment. Examples of cloud objects include data, programs, functions, forms, application programming interfaces (APIs), etc., according to various embodiments. The cloud server system may make cloud objects privately and/or publicly available via a network such as a local area network, an intranet, an extranet, the Internet, etc.

In various embodiments, the system 100 facilitates integration between and among desktop applications, mobile applications, web-based applications, hobbyist applications, etc. For example, in various embodiments, the system 100 supports one of or any suitable combination of two or more of programming infrastructure (e.g., various software development activities); remote processing infrastructure (e.g., including cloud storage and execution of user-defined functions and computer code); application programming interface (API) infrastructure (e.g., operable to automatically generate, implement, and/or document APIs according to use specifications); and other infrastructure as described below. The infrastructure may be software or hardware based infrastructure, or a combination of both software and hardware infrastructure.

In an embodiment, the system 100 includes one or more computers, such as a computer 102. The computer 102 includes one or more processors 104 and one or more memory devices 108. The computer 102 also includes, or is coupled to, one or more input devices 112. Additionally, the computer 102 includes, or is coupled to, one or more display devices 116. In some embodiments, the computer 102 includes one or more network interface devices 120. The one or more processors 104 (sometimes referred to herein as "the processor 104" for brevity), the one or more memory devices 108 104 (sometimes referred to herein as "the memory 108" for brevity), the one or more input devices 112 (sometime referred to herein as "the input device 112" for brevity), the one or more display devices 116 (sometime referred to herein as "the display device 116" for brevity), the one or more network interface devices 120 (sometime referred to herein as "the network interface device 120" for brevity), etc., may be communicatively coupled via one or more busses 124 (sometime referred to herein as "the bus 124" for brevity). In other embodiments, the computer 102 may have other suitable structures and/or components.

The one or more processors 104 may comprise one or more general purpose processors (e.g., a central processing unit (CPU)), one or more special purpose processors (e.g., a co-processor, a graphics processor, etc.). At least one of the one or more processors 104 executes machine readable instructions stored in the memory 108. The one or more memory devices 108 include one or more of random access memory (RAM), read only memory (ROM), a FLASH memory, a magnetic disk drive, an optical disk drive, etc.

The one more input devices 112 include one or more suitable input devices such as a keyboard, a key pad, a mouse, a trackball, one or more buttons, a touch screen that overlays a display device, etc. The one or more network interface devices 120 comprise one or more suitable network interface devices (NICs) such as a wired network NIC, a wireless network NIC, etc.

In some embodiments, the memory 108 may store a computational application 140 such as the MATHEMATICA® computational application from Wolfram Research, Inc., a spreadsheet application, etc., where the computational application 140 is configured to provide one of or any suitable combination of two or more of i) software development tools; ii) remote deployment tools (e.g., including remote storage and/or remote execution of user-defined functions and computer code); iii) application programming interface (API) development and/or deployment (e.g., operable to automatically generate, implement, and/or document APIs according to use specifications); etc. In some embodiments, the computational application 140 is configured to provide one of or any suitable combination of two or more of i) electronic message (e.g., email) processing development tools; ii) tools for deploying to a remote server system user-developed software functions for processing electronic message; iii) utilizing a remoter server system to process electronic messages; etc. For example, in an embodiment, the computational application 140 may include a cloud-based development front end 144 that enables creation of remotely stored objects, deployment of objects to a remote server system, and/or utilization of services provided by the remote server system, according to various embodiments. In some embodiments, the computational application 140 is configured to provide an electronic user interface such as a workspace (e.g., a notebook, a spreadsheet, a document, etc.) in which a user can enter software code and/or functions to be evaluated, cause the functions to be evaluated, and/or view results of the evaluations.

In some embodiments, however, the computational application 140 is a standalone application and/or module and the cloud-based development front end 144 is omitted. Additionally, in some embodiments, the server 152 and the cloud storage 180 are omitted.

On the other hand, in some embodiments, the computational application 140 is omitted and the cloud-based development front end 144 is a standalone application and/or module. In some embodiments, the cloud-based development front end 144 is incorporated into another suitable application different than the computational application 140.

In various embodiments, the computer 102 comprises a desktop computer, a workstation, a laptop computer, a tablet computer, a smart phone, a personal digital assistant, a gaming system, a cable television set top box, a server, etc.

In some embodiments, the computer 102 (and/or other computers (not shown)) is coupled to a network 150. The network 150 may comprise one or more of a local area network (LAN), a wide area network (WAN), a metropolitan area network (MAN), a mobile communications network, an intranet, an extranet, the Internet, etc.

In some embodiments, the system 100 may include one or more servers such as the server 152. FIG. 1 illustrates a single server 152 for brevity, but the system 100 includes multiple other similarly configured servers in some embodiments. In some embodiments, multiple servers (including the server 152) are networked together to provide online access to data storage and computer services or resources via the network 150. One server 152 will be discussed in detail with respect to FIG. 1, and other servers (if included) have the same or a similar suitable structure, in some embodiments.

The server 152 includes one or more processors 154 and one or more memory devices 158. The server 152 also may include, or be coupled to, one or more input devices 162. The server 152 includes one or more network interface devices 170. The one or more processors 154, the one or more memory devices 158, the one or more input devices 162 (sometime referred to herein as "the input device 162" for brevity), the one or more network interface devices 170 (sometime referred to herein as "the network interface device 170" for brevity), etc., may be communicatively coupled via one or more busses 174 (sometime referred to herein as "the bus 174" for brevity). In other embodiments, the server 152 may have other suitable structures and/or components.

The one or more processors 154 (sometime referred to herein as "the processor 154" for brevity) may comprise one or more general purpose processors (e.g., a CPU), one or more special purpose processors (e.g., a co-processor, a graphics processor, etc.). At least one of the one or more processors 154 executes machine readable instructions stored in the memory 158. The one or more memory devices 158 (sometime referred to herein as "the memory 158" for brevity) include one or more of RAM, ROM, a FLASH memory, a magnetic disk drive, an optical disk drive, etc.

The one more input devices 162 include one or more suitable input devices such as a keyboard, a key pad, a mouse, a trackball, one or more buttons, a touch screen that overlays a display device, etc. The one or more network interface devices 170 comprise one or more suitable NICs such as a wired network NIC, a wireless network NIC, etc. The server 152 is communicatively coupled to the computer 102 and other computers (not shown) via the communication network 150. The server 152 may be communicatively coupled to other cloud servers (not shown) via another network (not shown) and/or the network 150, in various embodiments.

Additionally, in some embodiments, the server 152 may be communicatively coupled to a cloud storage database system 180, which may comprise one or more suitable databases. The cloud storage database system 180 stores objects (cloud objects) 184 that are accessible, via the server 152 or another server, to computers (e.g., the computer 102) via the network 150.

In an embodiment, the memory 158 may store a cloud-based development system 188. In various embodiments, the cloud-based development system 188 is configured to interface with the cloud-based development front end 144 to transfer objects from the computer 102, to store objects in the cloud storage database 180, and/or to make objects 192 in the cloud storage database 180 accessible to computers via the network 150. In some embodiments, the computational application 140 is implemented as a kernel running on the server 152 and a front end running on the computer 102. In such embodiments, the cloud-based development system 188 includes the kernel. In some embodiments, the computational application 140 is included in the cloud-based development system 188 and the computer 102 runs a thin client such as a web browser. In some embodiments, aspects of the computational application 140 running on the server 152 (e.g., the kernel) are separate from the cloud-based development system 188.

In some embodiments, a user can utilize the computational application 140 and/or the cloud-based development front end 144, running on the computer 102, to create objects that are to be deployed to the cloud. The cloud-based development front end 144 may then interface with the cloud-based development system 188 to transfer the created objects to the server 152. The server 152 may then store the objects in the cloud storage database 180 and make the objects available to one or more computers via the network 150, or another network (not shown).

In some embodiments, the server 152 may be communicatively coupled to an answering system and/or natural language processing system such as described in U.S. Pat. No. 8,589,869 and/or U.S. patent application Ser. No. 13/678,168, filed Nov. 15, 2012, which are hereby incorporated by reference herein in their entireties. In some embodiments, the cloud-based development system 188 may interface with such systems and utilize natural language processing capabilities of such systems to process user input, for example.

In some embodiments, the server 152 utilizes virtualization techniques.

In various embodiments, a user can create an executable object such as a program, a function, an API, etc., and cause the executable object to be deployed to the cloud storage database 180 as a cloud object 184. In various embodiments, the deployed executable object (e.g., a program, a function, an API, etc.) can then be invoked (e.g., by the computer 102, another device not shown in FIG. 1, etc.) and executed by the server 152.

Thus, in various embodiments, the cloud-based development system 188 may include various functional modules such one of or any suitable combination of two or more of a computational kernel (e.g., a MATHEMATICA® kernel) for performing pre-defined functions and for executing computer-readable instructions based on an associated programming language (e.g., the Wolfram Language™); a data analysis engine configured to classify data in one or more data sets and/or to perform analysis, sometimes in cooperation with the computational kernel or other functional modules, of data in one or more data sets; a module to generate and/or implement APIs; a module to facilitate cloud execution of various computational functions requested from external devices (e.g., other computers, servers, and/or embedded devices) by, for example, receiving function calls originating in software executing on those external devices.

In some embodiments, an executable object that the user creates and deploys to the cloud storage database 180 as described herein is designed to be invoked by email messages and/or to process email messages, e.g., header information and/or email message content. For instance, the cloud-based development system 188 may return a unique ID (e.g., a long URL, or a short URL) corresponding to a deployed executable object and the unique ID in an email address, a subject line of an email, within content of the email, can be utilized to invoke the deployed program, function, API, etc., according to some embodiments.

The server 152 may include an email server 194. The email server 194 may be configured to invoke the deployed executable object in response to receiving an email message with a specific "to" address corresponding to the deployed executable object, with the unique ID in the subject line, with the unique ID in the content, etc., in various embodiments. As merely an illustrative example, the email server 194 may recognize a base email address as generally corresponding to invoking an executable object, and an extension to the base email address as indicating the particular executable object that is to be invoked, according to an illustrative embodiment. For example, the email address may be a base text string+a short URL corresponding to the deployed executable object, according to an embodiment.

In some embodiments, the server 52 may be communicatively coupled to an answering system and/or natural language processing system such as described in U.S. Pat. No. 8,589,869 and/or U.S. patent application Ser. No. 13/678,168, filed Nov. 15, 2012, which are hereby incorporated by reference herein in their entireties. In some embodiments, the email server 94 may interface with such systems and utilize natural language processing capabilities of such systems to process user input, for example.

In embodiments corresponding to a standalone system on the computer 102, however, the cloud-based development system 188 and the cloud storage 180 may be omitted. In such embodiments, executable objects such as discussed herein are stored in the memory 108, for example.

In some embodiments, the server 152 and/or the computer 102 may be communicatively coupled to an answering system and/or natural language processing system 198 (hereinafter "answering system 198") such as described in U.S. Pat. No. 8,589,869 and/or U.S. patent application Ser. No. 13/678,168, filed Nov. 15, 2012, which are hereby incorporated by reference herein in their entireties. In some embodiments, the computational application 140 and/or the cloud-based development system 188 may interface with the answering system 198 and utilize natural language processing capabilities of the answering system 198 to process electronic messaging information, for example. In some embodiments, the server 152 may be communicatively coupled to the answering system 198 via the network 150 or another suitable communication network separate from the network 150. In some embodiments, the computer 102 may be communicatively coupled to the answering system 198 via the network 150 or another suitable communication network separate from the network 150.

In various embodiments, a user can create an executable object such as a program, a function, an API, etc., for processing electronic messages (e.g., emails). In embodiments corresponding to a standalone system on the computer 102, the computational application 140 invokes and executes the executable object to process electronic messages. In various embodiments in which the executable object (e.g., a program, a function, an API, etc.) is deployed to the cloud storage 180, the executable object can then be invoked and executed by the server 52, for example when an email message is received by the email server 194 and found to contain a reference to the executable object. The executable object may be a standalone computer readable object (e.g., comprising machine readable instructions) executable on the processor 104 and/or the processor 154, or may be code in a language specifically intended to be executable by the computational application 140 and/or the cloud-based development system 188, which may be executed on the processor 104 and/or the processor 154. The executable object may perform numerical analysis, number crunching, or other functions on the data or information included in the received email message, for example.

In some embodiments, an executable object in the memory 108 and/or the database 180 is designed i) to be invoked in response to receiving email messages and/or ii) to process email messages, e.g., header information and/or email message content. For instance, electronic objects in the memory 108 and/or the database 180 may be indexed according to a unique ID (e.g., a locally or globally unique numeric or alphanumeric string such as a UID, a long URL, or a short URL), which may be included in an email address, in a subject line of an email, and/or within content of the email message. The unique ID can be utilized to invoke the executable object, e.g., a program, function, API, etc., according to some embodiments.

In some embodiments, the programming language may include a built-in function that is used to cause the computational application 140 to invoke the executable object. In an illustrative example discussed in more detail below, such as built-in function of the programming language is referred to as a "MailReceiverFunction".

In some embodiments, the email server 188 may be configured to invoke the executable object in response to receiving an email message with a specific "to" address corresponding to the executable object, with the unique ID in the subject line, with the unique ID in the content, etc., in various embodiments. As merely an illustrative example, the email server 94 may recognize a base email address as generally corresponding to invoking an executable object, and an extension to the base email address as indicating the particular executable object that is to be invoked, according to an illustrative embodiment. For example, the email address may be a base text string+a short URL corresponding to the deployed executable object, according to an embodiment.

For instance, in an embodiment, the server 152 receives an email message from the network 150. The processor 154 may communicate with the network interface 170 over the bus 174 to control the network interface 170 to receive the email message from a computer or another server via the network 150. The network interface 170 may receive the email message via the network according to any suitable communication protocol (e.g., TCP/IP, IMAP, or another suitable communication protocol), and place the received email message in the memory 158 via the bus 174. The server 152 may process the email message by the processor 154 reading the email message stored in the memory 158. The processor 154 may read one or more of the content of the email message, email message subject line, email message address fields, one or more documents or files attached to the email message, metadata included with the email message, etc., and perform an action according to the read content as discussed above. The action may be performed according to executable program instructions stored in the memory 158 and/or the cloud storage 180.

In an example, the processor 104 and/or processor 154 may parse the email message stored in the memory 108, the memory 158, and/or the cloud storage 180. The processor 104 and/or processor 154 may then perform a contextual analysis and/or natural language processing techniques according to executable program instructions stored in the memory 108, the memory 158, and/or the cloud storage 180 to analyze and/or understand the content of the email message stored in the memory 108 and/or the memory 158 and generate a response to the sender of the email message to be stored in the memory 108 and/or the memory 158. The processor 104 and/or processor 154 may then send the response (or cause an email server (e.g., the email server 194) to the sender of the email message via the network 50 using the network interface 120 and/or the network interface 170.

In some embodiments, the processor 104 and/or the processor 154 may interact with the answering system 198 to perform contextual analyses and/or natural language processing on electronic messaging information. In these embodiments, the processor 104 and/or the processor 154 may transmit the electronic message to be analyzed, or a portion thereof, to the answering system 198 via the network 150 using the network interface 120 and/or the network interface 170. The processor 104 and/or the processor 154 may then receive the analysis results from the answering system 198 via the network 150 using the network interface 120 and/or the network interface 170. Contextual analyses and/or natural language processing may also be performed on multiple electronic messages in a folder (e.g., of previously received email messages) stored in the memory 108 and/or the memory 158 from the same sender (or one or more other senders) to assist in understanding the content of the email message.

The computational application 140 and/or the cloud-based development system 188 may generate an automated response to a sender of received email message and send the response via the email server 194 (or another email server (not shown)). In some embodiments, the automated response may be sent by the processor 104 or the processor 154 to a third party over the network 150 using the network interface 120 or the network interface 170 rather than to the sender of the received email message. The email address of the third party may be determined by the processor 104 or the processor 154 based on a prior information, and/or according to the content of the received email message, in various embodiments.

In an example, one or more attachments of an email message received over the network 150 using the network interface 120 and/or the network interface 170 may be processed by the processor 104 and/or the processor 154 according to the type of attachment, the email address to which the attachment was sent, a keyword or identification code included in the email message, or subject matter of the email message ascertained via a contextual analysis of the email message, where the contextual analysis may be performed by the processor 104 and/or the processor 154 and/or by a remote processing system such as the answering system 198. A document received as an attachment may be converted by the processor 104 and/or the processor 154 from one format to another, e.g., from a word processing text document to a PDF document, from a comma separated value (CSV) document to a spreadsheet document, from an HTML document into a pure text document, etc. When multiple documents are received, the processor 104 and/or the processor 154 may collect and convert the multiple documents into a single document that incorporates the information from the multiple documents and store the single document in the memory 108 and/or the memory 158 and/or the cloud storage 180. The processor 104 and/or the processor 154 may perform the conversion by executing program instructions stored in the memory 108 and/or the memory 158 and/or the cloud storage 180, reading the email message from the memory 108 and/or the memory 158 via the bus 124 and/or the bus 174, and storing the converted document in the memory 108 and/or the memory 158 and/or the cloud storage 180.

The processor 104 and/or the processor 154 may also analyze and reformat the document received as an attachment to make the document easier to understand by a user and store the reformatted document in the memory 108 and/or the memory 158 and/or the cloud storage 180. The processor 104 and/or the processor 154 may also transmit the document received as an attachment to a third party via another medium, e.g., printed and mailed or faxed, rather than via the network 150. In some embodiments, the processor 104 and/or the processor 154 may transmit the document to a printer or a fax machine coupled with the processor 104 and/or the processor 154 via the bus 124 and/or the bus 174, or in some embodiments to a printer or fax machine via the network 150 (or another network) via the network interface 120 and/or the network interface 170. When the document is printed, the printed document is then mailed to the third party or sent to the third party using a courier service. When the document is faxed, the document is faxed to a fax telephone number associated with the third party. In some embodiments, the document is faxed using an electronic fax service that sends faxes to specified telephone numbers based on a received email including the specified telephone number and the desired contents of the fax.

In another example, the server 152 receives email messages from subscribers to an online computer system, which may include the server 152 or may be a separate computer system, reporting being unable to log into the online computer system. The online computer system may automatically deactivate subscriber accounts and their associated access to the online computer system when suspicious activity or potentially fraudulent activity is detected. Therefore, when the processor 154 of the server 152 processes email messages reporting problems logging into the online computer system, the email addresses from which the email messages are sent may be analyzed by the processor 154 to determine whether they originate from a university or educational institution. If they do, the processor 154 may automatically reactivate the online account associated with the email addresses from which the email messages reporting the online computer system access problem were received.

As another example, when a user is reading an email message using an email program or using a web browser communicating with the server 152, the server 152 (and/or a remote system such as the answering system 198) may analyze the content of the email message or messages and the server 152 may interact with the email program and/or the browser to show the user additional content related to the content of the email message or messages. The user's email program or web browser may execute on the server 152 or on a computer system (e.g., the computer 102) separate from the server 152, and in communication with the server 152 over the network 150 using a communication protocol. The additional content may be shown in another window on the user's computer system, or in another area of the window being used to read the email message. The additional content may be selected by the processor 154 of the server 152 and transmitted to the user's computer system to display at the user's computer system. The additional content may include advertisements selected based on keywords or subject matter of the analyzed email message being read. The additional content may also include other email messages previously received by the user that are related in some way to the analyzed email message. The additional content may include any other information available to the user's computer locally or through an online connection, including Wikipedia entries, web pages, social media account information, photographs, videos, audio recordings, and written documents. A contextual analysis may be used to determine whether there is a relationship between the additional content and the analyzed email message. The contextual analysis by be performed by the processor 154 of the server 512, or may be performed by a remote contextual analysis system (e.g., the answering system 198) in communication with the server 152 over the network 150.

In the illustrative example of a publicly traded company mentioned in the analyzed email message, the processor 154 may transmit additional content from the server 152 to the user's computer over the network 150 to cause a popup window to be launched on the user's computer system that shows the additional content, such as the current stock price, Wikipedia entries, and/or other public information about the company mentioned in the analyzed email message.

In various embodiments, functions performed by the cloud-based development system 188 discussed herein may be performed according to executable program code stored in the memory 158 and executed by the processor 154 using data communicated to the processor 154 over the bus 174 from the memory 158, input 162, network interface 170, and/or database 180. The processor 154 may transmit and/or receive data and results over the network 150 using the network interface 170 and/or store data and results in the database 180 and/or memory 158 via the bus 174. The server 152 may communicate with other servers 152 or other computer systems over the network 150. Functions discussed as being performed by the processor 154 herein may be performed by multiple different processors, and may be split between multiple different processors in various embodiments. Similarly, in some embodiments, functions performed by the computational application 140 discussed herein may be performed according to executable program code stored in the memory 108 and executed by the processor 104 using data communicated to the processor 104 over the bus 124 from the memory 108, input 112, and/or network interface 120. The processor 104 may transmit and/or receive data and results over the network 150 using the network interface 120 and/or store data and results in the memory 108 via the bus 124. The computer 102 may communicate with other computers (e.g., the servers 152) over the network 150. Functions discussed as being performed by the processor 104 herein may be performed by multiple different processors, and may be split between multiple different processors in various embodiments.

Illustrative embodiments of methods and systems for processing email messages and creating executable objects for processing email messages will first be described. Then, illustrative embodiments of methods and systems for deployment of executable objects such as programs, functions, APIs, etc., to network accessible storage will first be described. Then, illustrative embodiments of methods and systems for invoking deployed executable objects for processing email messages will be described.

MailReceiverFunction

In various embodiments, a programming language includes built-in functions that facilitate analysis of electronic messages such as emails. In various embodiments, one or more of the computational application 140, the cloud-based development front end 144, and the cloud-based development system module 188 are configured to evaluate such built-in functions to analyze electronic messages such as emails.

For example, in an embodiment, a MailReceiverFunction function enables a programmer to apply a user-defined function (e.g., defined by the user using software code written in the programming language) and/or one or more built-in functions of the programming language to one or more email messages, where the user-defined function and/or one or more built-in functions may be software code that can be executed by a machine (e.g., by the computer 102 and/or the server 152). The programming language defines the keyword "MailReceiverFunction" as indicating a particular built in function as described below, according to various embodiments. In various embodiments, one or more of the computational application 140, the cloud-based development front end 144, and the cloud-based development system module 188 are configured to recognize the keyword "MailReceiverFunction" as indicating the particular built in function as described below. For example, in various embodiments, one or more of the following syntaxes are utilized:

MailReceiverFunction[func]

In this example, a function func is applied to one or more email messages associated with an invoking the MailReceiverFunction. For example, an email message (or a pointer thereto) may be passed to the MailReceiverFunction as an argument or parameter of the MailReceiverFunction. In another example, a file containing one or more emails (or a pointer thereto, such as a file name and/or path) may be passed to the MailReceiverFunction as an argument or parameter of the MailReceiverFunction. In some embodiments, the MailReceiverFunction returns a result of applying the function func to the email or emails.

MailReceiverFunction[func]["string"]

In this example, the MailReceiverFunction decodes a string passed to the MailReceiverFunction as a mail message. For example, an email message (or a pointer thereto) may be passed to the MailReceiverFunction as an argument or parameter of the MailReceiverFunction. In another example, a file containing one or more emails (or a pointer thereto, such as a file name and path) may be passed to the MailReceiverFunction as an argument or parameter of the MailReceiverFunction.

MailReceiverFunction[func][File]

In this example, the MailReceiverFunction decodes the contents of a file (File) as a mail message. For example, an email message (or a pointer thereto) may be passed to the MailReceiverFunction as an argument or parameter of the MailReceiverFunction. In another example, a file containing one or more emails (or a pointer thereto, such as a file name and path) may be passed to the MailReceiverFunction as an argument or parameter of the MailReceiverFunction.

In an embodiment, when MailReceiverFunction is invoked, the computational application 140, the cloud-based development front end 144, and/or the cloud-based development system module 188 process the email(s) to identify a plurality of parameters in the email(s), and these parameters are then made available to the function (func). Then, the computational application 140, the cloud-based development front end 144, and/or the cloud-based development system module 188 applies the function func to the email(s), including passing one or more of the identified parameters to the function func.

In various embodiments, the computational application 140, the cloud-based development front end 144, and/or the cloud-based development system module 188 are configured to process emails to identify in the emails any suitable combination of two or more of the following example parameters:

Examples of general parameters include:

| | |
|---|---|
| "From" | sender name and email address |
| "FromAddress" | sender raw email address |
| "Subject" | the subject of the email address |
| "Body" | message body as a string |
| "Attachments" | list of processed attachments as expressions |
| "AttachmentData" | list of associations giving raw data on attachments |
| "ReceiverAddress" | email address of the mail receiver function |
| "ReceiverRoutingType" | whether the receiver is in "To", "Cc", or "Bcc" |

Examples of parameters related to senders and recipients include:

| | |
|---|---|
| "FromName" | sender full name |
| "ToList" | recipient names and addresses (except receiver function) |
| "ToAddressList" | recipient addresses (except receiver function) |
| "ToNameList" | recipient full names (except receiver function) |
| "CcList" | copied recipient names and addresses |
| "CcAddressList" | copied recipient addresses |
| "CcNameList" | copied recipient full names |
| "ReturnPath" | declared return path for the mail |
| "ReplyTo" | reply-to name and address |
| "ReplyToAddress" | reply-to address |

Examples of parameters related to attachments include:

| | |
|---|---|
| "Attachments" | list of expressions giving the content of attachments |
| "AttachmentNames" | list of names assigned to attachments |
| "AttachmentAssociations" | associations giving content and metadata of attachments |

Examples of parameters related to message identification and threading include:

| | |
|---|---|
| "MessageID" | message ID for this message |
| "ReplyToMessageID" | ID of a message to which this replies, if any |

Examples of parameters related to message routing include:

| | |
|---|---|
| "Precedence" | declared mail precedence |
| "ReturnReceiptRequested" | whether a return receipt is requested |
| "DeliveryChainHostnames" | hostnames on the mail delivery chain |
| "DeliveryChainRecords" | full records on the mail delivery chain |

Examples of parameters associated with mail headers include:

| | |
|---|---|
| "HeaderString" | complete email headers as a string |
| "HeaderRules" | list of rules for all headers |
| "CharacterEncoding" | character encoding for email content |
| "ContentType" | MIME content type of email body |

Examples of parameters associated with message origination include:

| | |
|---|---|
| "OriginatingMailClient" | type of originating mail client |
| "OriginatingIPAddress" | IP address of the originating client machine |
| "OriginatingHostname" | hostname of the originating client machine |
| "OriginatingCountry" | geoIP-inferred originating country |
| "OriginatingDate" | date and time on client from email headers |
| "OriginatingTimezone" | client time zone based on email headers |
| "ServerOriginatingDate" | date and time on originating server |
| "ServerOriginatingTimezone" | time zone of originating server |

Examples of further parameters include:

| | |
|---|---|
| "Association" | a list of all identified parameters. |

In an embodiment, the identified parameters are made available in respective formats and/or data types that are recognized by the computational application 140, the cloud-based development front end 144, and/or the cloud-based development system module 188 as corresponding to various elements of email messages. The programmer input defining the function func may refer to these parameters using keywords, and thus the function func may utilize the parameters when evaluating.

FIG. 2 illustrates example programmer input 200 for evaluating emails, according to an embodiment. The programmer input 200 includes a first portion 204 that defines a function func to be applied to emails. The programmer input 204 corresponds to a function that i) searches a body of a first email for the string "table", and ii) if the string "table" is found within the body of the first email, a new second email is sent that a) forwards the first email and b) indicates that the first email mentions a table. This may be useful, for example, if a user wishes to buy a table and thus wishes to analyze many emails to determine if any of them relate to selling a table. The use is notified (via the second email) whenever a first email is found that mentions the word "table". The programmer input 204 includes keywords (e.g., Body, From) that indicate parameters corresponding to various elements of email messages. In an embodiment, the computational application 140, the cloud-based development front end 144, and/or the cloud-based development system module 188 are configured to process emails to identify in the emails the parameters, and then make those parameters available to functions such as the function func illustrated in FIG. 2. Thus the function func may utilize the parameters when evaluating an email.

The programmer input 200 also includes a second portion 208 that causes the function, defined by the first portion 204, to be applied to emails in a mailbox file. For example, the emails in the mailbox file may have been previously retrieved from a server (e.g., an email server) via a network.

FIG. 3A illustrates example programmer input 300 for evaluating emails, according to an embodiment. The programmer input 300 includes a first portion 304 that defines a function func to be applied to emails. The programmer input 304 corresponds to a function that i) searches a body of a first email for the string "table", and ii) if the string "table" is found within the body of the first email, the information from the email (sender, prices extracted from the email, body of the message, attachments) is appended to data structure called "TablesForSale" having the following elements: "Seller", "Prices", "Date", "Message", and "Pictures".

The programmer input 300 also includes a second portion 308 that causes the function, defined by the first portion 304, to be applied to emails in a mailbox file. For example, the emails in the mailbox file may have been previously retrieved from a server (e.g., an email server) via a network. Emails in the mailbox file will thus be evaluated and information extracted from emails with the word "table" will be appended to the data structure TablesForSale.

FIG. 3B illustrates example programmer input 304 for evaluating the data structure TablesForSale and resulting output 308, according to an embodiment. The programmer input 304 causes the elements "Prices" and "Date" to be retrieved from the data structure TablesForSale and displayed as output 308.

Referring now to FIGS. 1-3B, in some embodiments, the computational application 140 is configured to evaluate the programmer input, and thus the examples of FIGS. 1-3B can be implemented in a standalone computer. In other embodiments, the examples of FIGS. 1-3B are implemented in a client-server system.

As mentioned above, in some embodiments, functions such as described above can be deployed to network accessible storage. Illustrative embodiments of methods and systems for deploying and invoking deployed executable objects for processing email messages are now described.

Cloud Deployment

In various embodiments, a programming language includes built-in functions that facilitate one or more of deployment of objects to the cloud, access to objects in the cloud, and/or manipulation of objects in the cloud. In various embodiments, one or more of the computational application 140, the cloud-based development front end 144, and the cloud-based development system module 188 are configured to evaluate such built-in functions to deploy objects to the cloud, access objects in the cloud, and/or manipulate objects in the cloud. In some embodiments, such functions that facilitate one or more of deployment of objects to the cloud are utilized in conjunction with built-in functions that facilitate analysis of electronic messages such as emails.

In an embodiment, a CloudDeploy function enables a programmer to deploy an expression to the cloud, where the deployed expression can be software code that can be executed (e.g., by the server 152), data that can be accessed and/or manipulated, etc. The programming language defines the keyword "CloudDeploy" as indicating a particular built in function as described below, according to various embodiments. In various embodiments, one or more of the computational application 140, the cloud-based development front end 144, and the cloud-based development system module 188 are configured to recognize the keyword "CloudDeploy" as indicating the particular built in function as described below. For example, in various embodiments, one or more of the following syntaxes are utilized:

CloudDeploy[expr]

In this example, an expression expr is deployed as a cloud object, and the server 152 assigns a universal resource identifier (URI) to the cloud object. In some embodiments, the URI may include a universally unique identifier (UUID), such as the UUID standardized by the Open Software Foundation (OSF) as part of the Distributed Computing Environment (DCE). The URI may be a universal resource locator (URL), in some embodiments. Evaluation of this function returns a handle to the cloud object. The cloud object can then be accessed using the handle.

CloudDeploy[expr, "uri"]

In this example, an expression expr is deployed as a cloud object at a given URI.

CloudDeploy[expr, CloudObject["uri"]]

In this example, an expression expr is deployed to a given cloud object. CloudObject is a handle to a cloud object at a specified URI.

In some embodiments, CloudDeploy can be utilized with one or more suitable options. For example, in some embodiments, parameters can be utilized with CloudDeploy to specify how the deployed object is to be evaluated. For instance, in some embodiments, one or more parameters can be specified to indicate that the object is to be invoked in response to email messages corresponding to the object. As another example, one or more parameters can be specified to indicate one or more of i) the object is to be private to the user (e.g., the object can only be accessed by the user), ii) the object is to be public (e.g., the object is publicly available on the web), iii) the object is to be available to specified users, iv) the object is to be available to one or more classes of users, etc.

In some embodiments, techniques described in U.S. patent application Ser. No. 14/549,541, may be utilized for deployment of objects to the cloud, access to objects in the cloud, and/or manipulation of objects in the cloud, etc. U.S. patent application Ser. No. 14/549,541, filed on Nov. 20, 2014, entitled "Methods and Systems for Cloud Computing," is hereby incorporated by reference.

Figure 4:
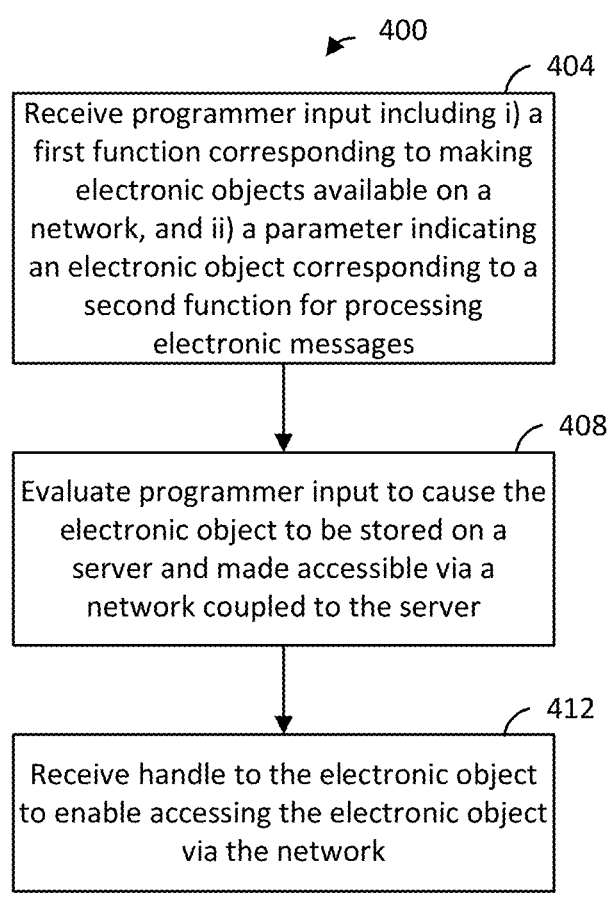
FIG. 4 is a flow diagram of an example method for deploying an object to network-accessible storage, according to an embodiment.

FIG. 4 is a flow diagram of an example method 400 for deploying objects to a cloud environment to enable accessing the objects via a network. In some embodiments, the method 400 may be implemented at one or more computers, such as the computer 102 and/or the server 152 of FIG. 1. Merely for explanatory purposes, FIG. 4 is described in the context of the method 400 implemented by the computer 102. In other embodiments, however, the method 400 may be implemented jointly at the computer 102 and the server 152, at another suitable computer (not shown in FIG. 1), at one or more other computers/servers, etc.

In some embodiments, the method 400 may be implemented as part of a software program being executed on a computer, such as the computer 102, the server 152 running a kernel, etc. In some embodiments, the method 400 may be implemented by the computational application 140 being executed on the computer 102, a kernel of the computational application 140 being executed on the server 152, etc. In some embodiments, the method 400 may be implemented, at least partially, by the cloud-based development front end 144, the cloud-based development system 188, or a combination of the two.

At block 404, programmer input in a programming language is received, the programmer input including i) a first function corresponding to making electronic objects accessible on a network, and ii) a parameter indicating an electronic object corresponding to a second function for analyzing electronic messages such as emails. For example, in an embodiment, a programmer enters the programming input via a user interface of or coupled to the computer 102. In some embodiments, the programmer input may be entered into a notebook, workspace, etc., of the computational application 140. In some embodiments, the first function may be a built-in function of the programming language. In an embodiment, the first function is the CloudDeploy function. The second function may be a function for analyzing electronic messages such as described above. In some embodiments, the second function includes a keyword such as MailReceiverFunction, or another suitable keyword, corresponding to a built-in function of a programming language for facilitating analysis of electronic messages.

In various embodiments, the electronic object indicated by the parameter may include one or more of data, further programming input in the programming language, etc.

In various embodiments, the programmer input includes one or more other parameter regarding how the object is to be deployed. For example, in various embodiments, the programmer input may include a further parameter indicating that the electronic object is to be evaluated by the server in response to email corresponding to the object.

As another example, in various embodiments, the programmer input may include a further parameter indicating permission information for access to the object after deployment.

As another example, in various embodiments, the programmer input may include a further parameter indicating a location at which the object is to be deployed, such a handle to an already deployed object, a URI, etc.

At block 408, the programmer input is evaluated to cause the electronic object to be stored on a server and made accessible via a network coupled to the server. For example, in an embodiment, the programmer input is evaluated at the computer 102 by the computational application 140. As another example, in an embodiment, block 408 includes, additionally or alternatively, evaluating the programmer input at the server 152 by a server-side portion (e.g., a kernel, etc.) of the computational application 140.

In an embodiment, block 408 includes the computer 102, in response to evaluating the programmer input, sending a message to the server 152 via the network 150, the message requesting the server 152 to deploy the object in the cloud storage 180 and to make the object accessible via the network 150 (or another network coupled to the cloud storage 180). In various embodiments and/or scenarios, the message includes the object or an indicator of where the object may be obtained, such as a pointer to where the object is stored in a memory (e.g., the memory 108, the cloud storage 180, etc.), a URI corresponding to the object, etc.

In some embodiments and/or scenarios, the message may contain one or more further parameters such as a further parameter indicating how the electronic object is to be evaluated by the server, a further parameter indicating to the server that the object is to be evaluated by the server in response to emails corresponding to the object, etc. As another example, in some embodiments, the message may contain a further parameter indicating permission information for access to the object after deployment.

In an embodiment in which the programmer input is evaluated at the server 152, block 408 may include the server 152 extracting from the programmer input the object or an indicator of where the object may be obtained, such as a pointer to where the object is stored in a memory (e.g., the memory 108, the cloud storage 180, etc.), a URI corresponding to the object, etc. In an embodiment in which the programmer input is evaluated at the server 152, block 408 may include the server 152 extracting from the programmer input further parameters such as described above.

In response to evaluating the programmer input and/or receiving the message discussed above, the server 152 may store the object in the cloud storage 180 and make the object accessible via the network 150 (or another network), in various embodiments. In an embodiment, the server 152 may determine where in the cloud storage 180 the object is to be deployed. If provided in the message and/or the programmer input, the server 152 may utilize a parameter included in the programmer input that indicates a location at which the object is to be deployed, in an embodiment.

If provided in the message and/or the programmer input, the server 152 may utilize one or more parameters specifying how the object is to be deployed such as how often, when, etc., the object is to be evaluated when deployed, permission information for access to the object, etc., and may the server 152 may deploy the object according to the parameters.

At block 412, in response to evaluating the programmer input, a handle to the deployed electronic object is received, the handle to enable accessing the electronic object via the network. In various embodiments, the handle may comprise a pointer, a web page address, a Hypertext Transfer Protocol (HTTP) address, a URI, a universal resource locator (URL), etc. In an embodiment, the handle comprises a messaging address (e.g., an email address) corresponding to invoking the electronic object. For example, in an embodiment, the electronic object, after being deployed, can then be invoked by sending an electronic message to the address.

In an embodiment, the server 152 may send the handle to the computer 102 via the network 150. In an embodiment, the server 152 may include the handle in a subsequent message that is responsive to a message sent from the computer 102 to the server 152 that requested the server 152 to deploy the object in the cloud storage 180 and to make the object accessible via the network 150 (or another network).

In some embodiments, block 412 is omitted. For example, in some embodiments, the server may publish the handle, URI, URL, messaging address, email address, etc., to a repository (e.g., in the cloud storage 180 or another suitable location) where the handle, URI, URL, messaging address, email address, etc., can be retrieved.

Instant API

Referring again to FIG. 1, the system 100 may facilitate efficient generation of application programming interfaces (APIs), and deployment of APIs to the web, according to some embodiments. For example, the cloud-based development system 188 and/or the cloud-based development front end 144 may include an API generation module that enables efficient and flexible generation of APIs. Embodiments of an API generation module and techniques for generating APIs are discussed below. In some embodiments, such modules and techniques may be implemented by the system 100 of FIG. 1. In other embodiments, such modules and techniques may be implemented by systems different than the system of FIG. 1.

Figure 5:
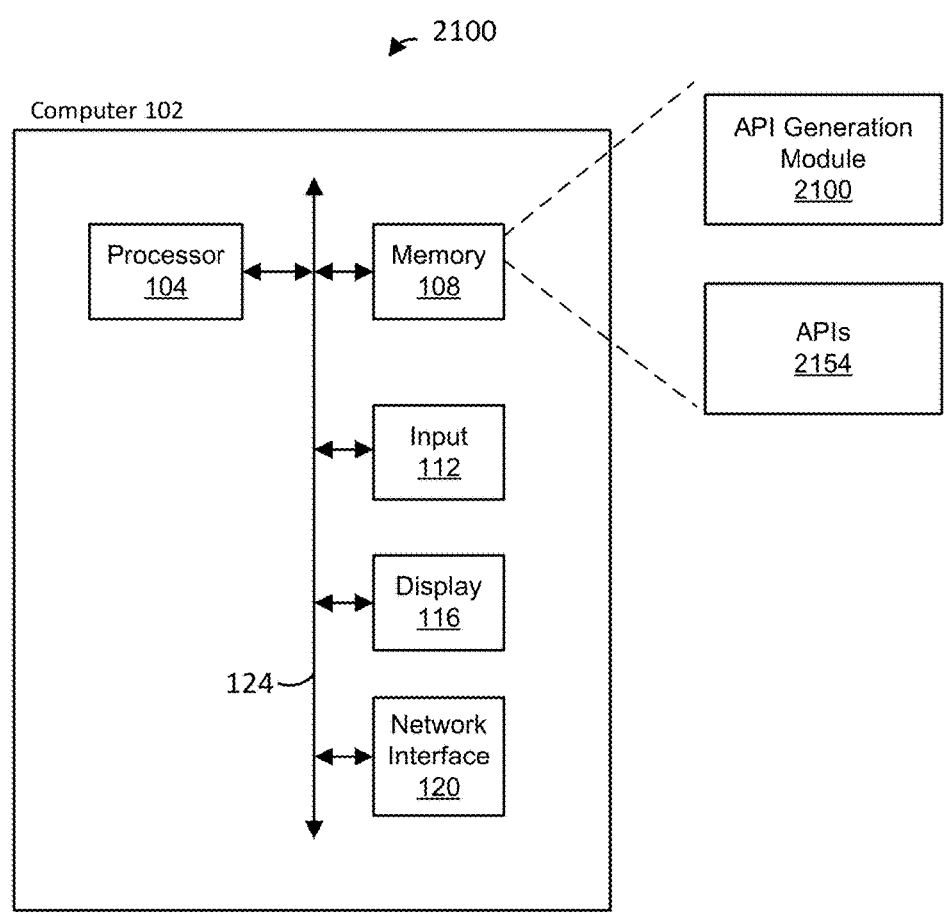
FIG. 5 is a diagram of an example system for generating application programming interfaces (APIs), according to an embodiment.

For example, FIG. 5 is a diagram of an example system 2100 for creating APIs, according to an embodiment. As described in more detail below, the system 2100 enables efficient and flexible generation of APIs, according to some embodiments.

In an embodiment, the system 2100 includes a computer similarly structured to the computer 102 of FIG. 1. For purposes of brevity, like-numbered components are not described in detail.

In an embodiment, the memory 108 may store an API generation module 2150 that facilitates generation of APIs, as will be described in more detail below. In an embodiment, the API generation module 2150 comprises software instructions that, when executed by the processor 104, causes the processor to evaluate programming input from a programmer to generate an API such that the API subsequently can be utilized to perform a processing action. For example, as will be described in more detail below, the generated API can be utilized by a software program running on the computer 102, the computational application 140 running on the computer 102 (not shown in FIG. 5), etc., according to various embodiments. As another example, as will be described in more detail below, the generated API can be deployed to cloud storage and made network accessible (e.g., using CloudDeploy or another suitable mechanism), and a software program running on the computer 102 or another suitable computer, the computational application 140 running on the computer 102 (not shown in FIG. 5) or another suitable computer, a cloud-based program running on one or more servers, etc., may utilize the API via a network, according to various embodiments.

In some embodiments, generated APIs 2154 are stored in the memory 108.

In some embodiments, the API generation module 2150 is a component of the cloud-based front end 144. In some embodiments, the API generation module 2150 is a component of a compiler, i.e., a computer program that transforms source code written in a programming language into another computer language, typically to create an executable program. In some embodiments, the API generation module 2150 is a component of an interpreter, i.e., a computer program that directly executes, i.e. performs, instructions written in a programming or scripting language (referred to herein for brevity as a "programming language"), without first compiling the instructions into a machine language program. Thus, in some embodiments, the programming input evaluated by the API generation module 2150 includes software instructions written in a programming language.

In some embodiments, the API generation module 2150 is a component of a software application such as a computational application 140 (FIG. 1). For example, the API generation module 2150 may be a component of the MATH-EMATICA® computational software program developed by Wolfram Research, Inc., according to a specific embodiment.

In an embodiment, an APIFunction function enables a programmer to create an API. The programming language defines the keyword "APIFunction" as indicating a particular built in function as described below, according to various embodiments. In various embodiments, one or more of the computational application 140, the cloud-based development front end 144, the cloud-based development system module 188, and/or the API generation module 2100 are configured to recognize the keyword "APIFunction" as indicating the particular built in function as described below.

Figure 6:
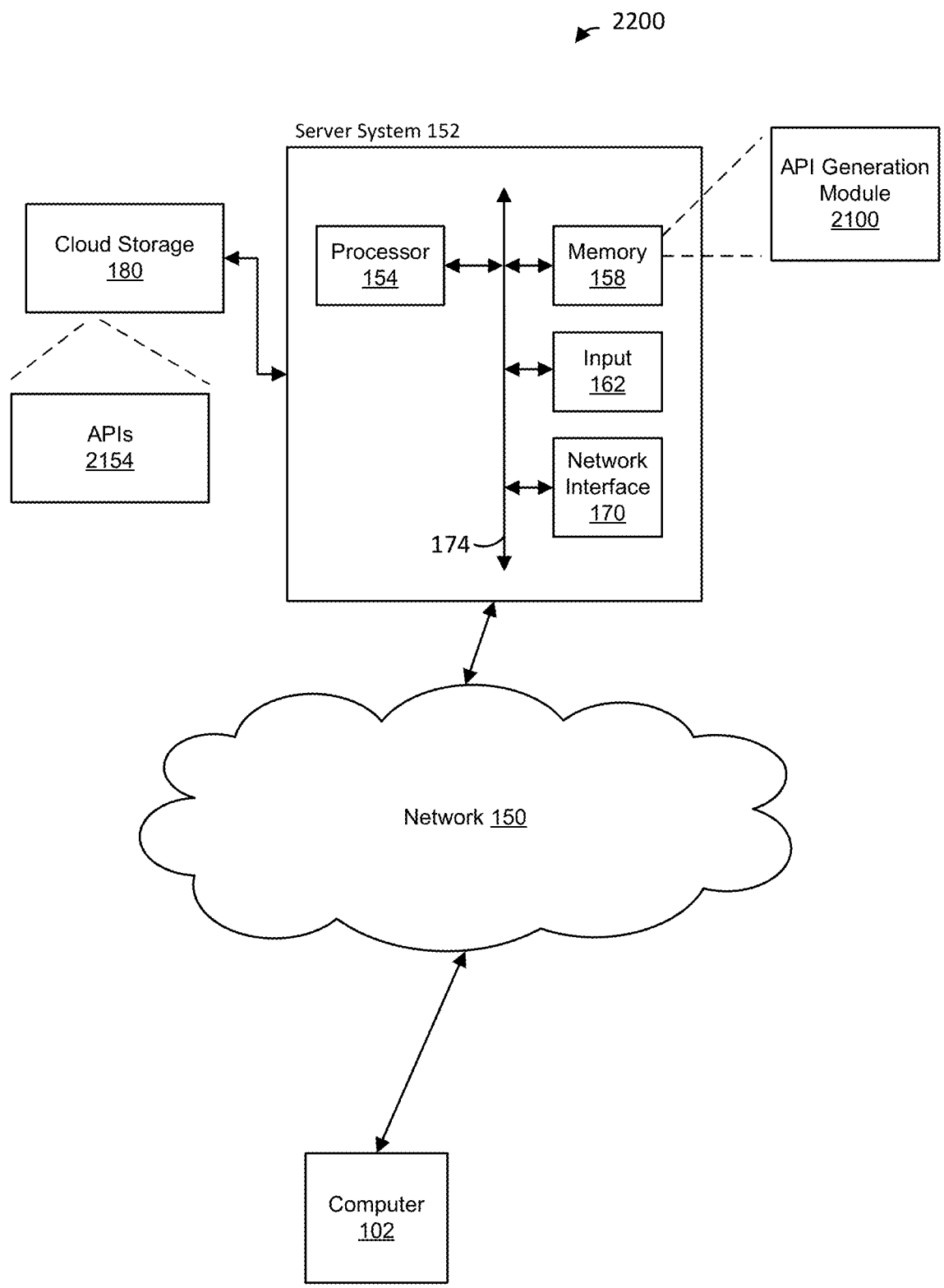
FIG. 6 is a diagram of another example system for generating APIs, according to another embodiment.

FIG. 6 is a diagram of another example system 2200 for generating APIs, according to another embodiment. As described in more detail below, the system 2200 enables efficient and flexible generation of APIs, according to some embodiments. In an embodiment, the system 2200 is similarly structured to the system 100 of FIG. 1. For purposes of brevity, like-numbered components are not described in detail.

In an embodiment, the memory 158 may store some or all of the API generation module 2100 discussed above. For example, in an embodiment, the API generation module 2100 is implemented as a client-server system, and the memory 158 stores a server portion of the API generation module 2100, whereas the memory 108 of the computer 102 stores a client portion of the API generation module 2150. In an embodiment, a programmer uses the computer 102 to provide programming input to the server 152 via the network 150. The server 152 then generates an API, and the API is stored in a memory. For example, in an embodiment, the API is stored in the memory 158 and/or the cloud storage 180. In some embodiments, the cloud storage 180 is omitted. In another embodiment, the API is transmitted to the computer 102, via the network 150, and is stored in the memory 108. In another embodiment, the API is stored in a memory of another server system (e.g., a web server (not shown)) so that the API is accessible via the Internet, for example.

Figure 7:
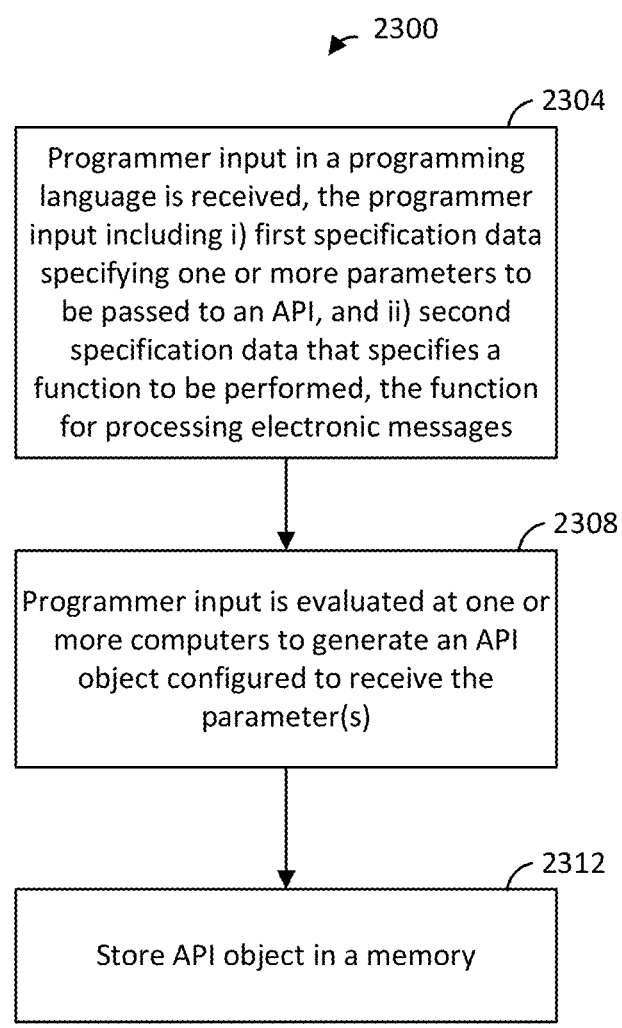
FIG. 7 is a flow diagram of an example method for generating APIs, according to another embodiment.

FIG. 7 is a flow diagram of an example method 2300 for generating an API, according to an embodiment. The method 2300 may be implemented by the computer 102 of FIG. 5 and/or the system 2200 of FIG. 6, in some embodiments, and the method 2300 is discussed with reference to FIGS. 5 and 6 for explanatory purposes. In other embodiments, however, the method 2300 is implemented by a suitable computer or a suitable system (e.g., multiple computers) other than the computer 102 and/or the system 2300 (e.g., by the system 100 of FIG. 1 or another suitable system).

At block 2304, programmer input in a programming language is received at one or more computers. For example, programmer input is received, via one or more input devices 112, at the computer 102. In some embodiments, the computer 102 transmits the programmer input to the server 152 via the network 150, and thus the programmer input is received at the server 152. The programmer input includes i) first specification data corresponding to input parameters for an API to be generated, and ii) second specification data that indicates a function to performed, the function for analyzing electronic messages such as emails.

Figure 8A:
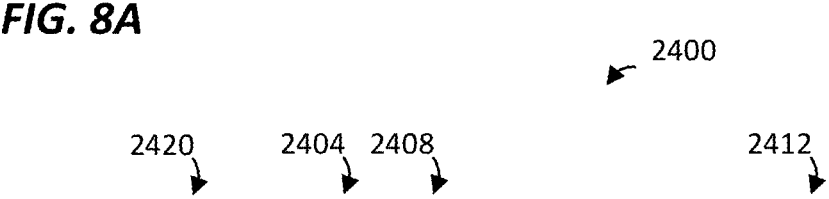
FIG. 8A is an illustration of a notebook including example programmer input for generating an API, according to an embodiment.

FIG. 8A illustrates an example of programmer input 2400 such as programmer input that can be received at block 2304, according to an illustrative embodiment. The programmer input 2400 includes built-in function 2404 of a programming language, i.e. APIFunction[ ], that a programmer may utilize to efficiently create an API. The programming language defines the keyword "APIFunction" as indicating a particular built in function as described below, according to various embodiments. In various embodiments, one or more of the computational application 140, the cloud-based development front end 144, and the cloud-based development system module 188 are configured to recognize the keyword "APIFunction" as indicating the particular built in function as described below.

The built-in function 2404 includes two arguments: first specification data 2408 and second specification data 2412, where the first specification data 2408 specifies an input parameter to an API to be generated, and the second specification data that specifies a function to be applied to input parameter. In some embodiments, the first specification data also may specify, for each of at least some input parameters, a type of the parameter.

The second specification data 2412 defines a function to be applied to emails. The programmer input 2412 corresponds to a function that i) searches a body of a first email for the string "table", and ii) if the string "table" is found within the body of the first email, a new second email is sent that a) forwards the first email and b) indicates that the first email mentions a table.

The programmer input 200 also includes a second portion 208 that causes the function, defined by the first portion 204, to be applied to emails in a mailbox file.

Referring again to FIG. 7, at block 2308, the programmer input is evaluated at one or more computers to generate an API that can be passed one or more parameters and that performs the specified function. For example, the API generation module 2100 may evaluate the programmer input, in an embodiment, to generate the API. In some embodiments, the programmer input is fully evaluated in response to receiving the programmer input. In other embodiments, the programmer is only partially evaluated. For example, in some embodiments, the second specification data 2412 may not be fully evaluated. For instance, if the specification data 2412 includes software code specifying a function to be performed, the software code may not be evaluated until the API is subsequently invoked or utilized, according to some embodiments. The API generation module 2100 may utilize the first specification data 2408 and the second specification data 2412 (and some or all (or none) of other arguments(s) and/or parameters, if provided in the programmer input) to generate the API. The API may include an electronic object having software instructions, where the electronic object is configured such that parameter(s) (specified by the first specification data) can be passed to the electronic object and the electronic object can be invoked to perform the specified function (specified by the second specification data) using the specified parameter(s), in some embodiments. In an embodiment, the API includes software instructions that can be executed by one or more computers to cause the one or more computers to perform the specified function using the specified parameter(s).

In some embodiments, the computer 102 implements block 2308. In some embodiments, the server 152 implements block 2308. In some embodiments, the computer 102 and the server system 202 together implement block 2308.

At block 2312, the API generated at block 2308 is stored in a memory. For example, in an embodiment, the API is stored in the memory 108. In another embodiment, the API is stored in the memory 158. In another embodiment, the API is stored in the cloud storage 180. In another embodiment, the electronic form object is stored in some other suitable memory such as a memory of a web server (not shown in FIGS. 5 and 6).

Figure 8B:
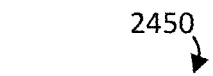
FIG. 8B is an illustration of a notebook including example programmer input for invoking an API, according to an embodiment.

Referring again to FIG. 8A, the programmer input 2400 includes a name 2420 for the API. The name 2420 ("func") can be utilized to access the API, in an embodiment. For example, FIG. 8B illustrates an example of programmer input 2450 that is used to access the API and provide a parameter to the API, according to an illustrative embodiment. The programmer input 2450 includes the name of the API ("func") and also data that indicates the parameter, e.g., a file name in which email messages are stored. In response, the API is evaluated. In the illustrative embodiment of FIG. 8B, the programmer input 2450 may be entered into a file, a notebook, a web page, etc. In other embodiments other suitable programmer input is received in another suitable manner, such as via a spreadsheet, etc.

In some embodiments, the API may be created by the API generation module 2100 and/or the API generation module 2150 then made available for use by one or more of another application (e.g., different than the computational application 140), another program, and/or a different computer from the computer(s) on which the API was generated.

For example, in some embodiments, the generated API may be made accessible via network-accessible storage, such as the cloud storage 180. For example, the generated API may be made accessible via a URL, a URI, etc., or some other suitable mechanism. In some embodiments, the CloudDeploy function may be utilized to deploy an API to network-accessible storage such as the cloud storage 180.

In some embodiments, techniques described in U.S. patent application Ser. No. 14/549,541, may be utilized for generation of APIs, accessing APIs, etc.

Figures 9A, 9B:
FIG. 9A is an illustration of a notebook including example programmer input for generating an API and deploying the API to network-accessible storage, according to an embodiment.
FIG. 9B is an illustration of a web page generated by invoking an API, according to an embodiment.

FIG. 9A is an illustrative example in which a programmer utilizes the CloudDeploy function and the APIFunction to generate an API and deploy the generated API to network-accessible storage, such as the cloud storage 180. In the example of FIG. 9A, the API to be deployed utilizes a built-in function of MATHEMATICA®, GeoGraphics. The GeoGraphics function generates a 2-dimensional (2D) geographic image.

Programmer input 2500 includes the APIFunction 2504, first specification data 2508, and second specification data 2512, where the first specification data 2508 specifies an input parameter to an API to be generated and a type of the parameter, and the second specification data 2512 that specifies a function to be applied to input parameter. For instance, the specification data 2508 specifies an input parameter "name" of a type "Country", and the second specification data 2512 specifies that the GeoGraphics function is to be applied to the "country" input parameter to draw a polygon of the country indicated by the input parameter, and to generate a result in a Portable Network Graphics (PNG) format.

Additionally, the programmer input 2500 includes the CloudDeploy function 2540. Evaluation of the CloudDeploy function in FIG. 9A returns a handle corresponding to deployment of the expression. The handle includes a URL that enables access to the API. FIG. 9B illustrates a web page that a user sees when entering, in a web browser, a URL corresponding to the handle, and appending a parameter input to the URL (e.g., "?name=Italy"). In particular, the web page includes 2D geographic polygon drawing of Italy. In an embodiment, a server, such as the server 152, receives the URL with the appended parameter information from a requesting computer, uses the URL to locate the API in the cloud storage 180, evaluates the API using the appended parameter information to generate a result, and the returns to the requesting computer the result in a web page.

Thus, in various embodiments, the cloud-based development system 188 may be configured to perform one or more of, or various suitable combinations of two or more of: create an API, deploy the API, give and/or associate the API a name, associate the API with one or more methods, actions, and/or functions to be performed (e.g., methods, actions, and/or functions corresponding to the processing of electronic messages such as emails), and associate the API with one or more various parameters, store the API in the cloud storage 180, create a mapping paradigm to map portions of a URL or URI to the methods, actions, and/or functions and/or to the parameter(s) of the methods, actions, and/or functions, such that the methods, actions, and/or functions can be called from a browser, by a website, by a mobile application, by a form, etc., merely by sending a URL complying with the API. In embodiments, the cloud-based development system 188 may generate documentation for the API, describing the implementation of the API, the mapping of the methods, actions, and/or functions to the URL, the format of the data returned by the API, etc.

In some embodiments, the cloud-based development system 188 provides an option to allow a user to interact with the cloud-based development system 188 to edit or revise the mapping, the API name, and other aspects of the API creation. For example, in embodiments, the instant API module may suggest additional functions or methods to add to the API. The instant API module may also facilitate the use of data, variables, and/or parameters stored in network accessible storage (i.e., on the cloud servers), and/or data stored at a location specified by a URL. For example, the cloud-based development system 188 may provide various user interface mechanisms to permit a user to facilitate editing/revisions such as described above.

In some embodiments, the APIs can be configured to accept natural language (i.e., free-form) inputs. As an illustrative example, an API may be configured to accept a date input specified as "first Monday before Christmas." The API and/or the cloud-based development system 188 may include a module configured to convert such natural-language input to a canonical form.

In an embodiment, the programming language utilized by the computational application 140 (e.g., the Wolfram Language™ utilized by MATHEMATICA®) and associated with the cloud-based development system 188 permits representation of at least some objects (e.g., APIs) symbolically in the cloud.

In some embodiments, the computational application 140, the cloud-based front end 144, and/or the cloud-based development system 188 utilizes a computable document format (CDF) that allows exchange of components with interactive features between desktop and mobile platforms and the cloud-based development system 188 (for example). An author can generate a CDF document on desktop software (e.g., MATHEMATICA®), and deploy it to the cloud storage 180 using native function calls. From the cloud platform it can be served according to access control information to web visitors (e.g., publically, privately, or only to those who have a link to the document). The author can then access the deployed CDF (e.g., via the cloud-based development system 188) to make modifications. A revised version is then made available to all platforms automatically.

Invoking Executable Objects by Electronic Messages Such as Emails

Referring again to FIG. 1, after an executable object has been deployed to the cloud storage database 180 using techniques such as described above (or using other suitable techniques), the executable object may be invoked via email, according to some embodiments.

FIG. 10 illustrates example programmer input 3000 for evaluating emails, according to an embodiment. The programmer input 3000 is similar to the programmer input 300 of FIG. 3A, and includes a first portion 3004 that defines a function func to be applied to emails. The programmer input 3004 corresponds to a function that i) searches a body of a first email for the string "table", and ii) if the string "table" is found within the body of the first email, the information from the email (sender, prices extracted from the email, body of the message, attachments) is appended to data structure called "TablesForSale" having the following elements: "Seller", "Prices", "Date", "Message", and "Pictures".

The programmer input 3000 also includes a second portion 3008 that causes the function, defined by the first portion 3004, to be deployed as a cloud object that applies the function to emails sent to the cloud object. Emails sent to the cloud object will thus be evaluated and information extracted from emails with the word "table" will be appended to the data structure TablesForSale in a manner similar to that described with reference to FIGS. 3A and 3B.

FIG. 10 also illustrates an output 3012 generated by one or more of the computational application 140, the cloud-based development front end 144, and/or the cloud-based development system module 188 in response to evaluation of the programmer input 3008. The output 3012 includes an email address 3016 that can be utilized to send emails to the deployed cloud object. In an embodiment, the email address 3016 includes a unique ID 3020 associated with the deployed cloud object.

FIG. 11 illustrates example programmer input 3100 for evaluating emails, according to an embodiment. The programmer input 3100 includes a first portion 3004 that defines a function func to be applied to emails. The programmer input 3104 corresponds to a function that, upon receiving a first email, sends a second email that includes an indication of sender of the first email and the subject line of the first email.

The programmer input 3100 also includes a second portion 3108 that causes the function, defined by the first portion 3104, to be deployed as a cloud object that applies the function to first emails sent to the cloud object. First emails sent to the cloud object will thus be evaluated and corresponding second emails will be sent.

FIG. 11 also illustrates an output 3112 generated by one or more of the computational application 140, the cloud-based development front end 144, and/or the cloud-based development system module 188 in response to evaluation of the programmer input 3108. The output 3112 includes an email address 3116 that can be utilized to send emails to the deployed cloud object. In an embodiment, the email address 3116 includes a unique ID 3120 associated with the deployed cloud object.

In the examples of FIGS. 10 and 11, the email addresses 3016 and 3116 include a base email address (e.g., receiver+ . . . @wolframcloud.com) generally corresponding to invoking an executable object, and an extension 3020, 3120 to the base email address that indicates the particular executable object that is to be invoked, according to an illustrative embodiment.

Figure 12:
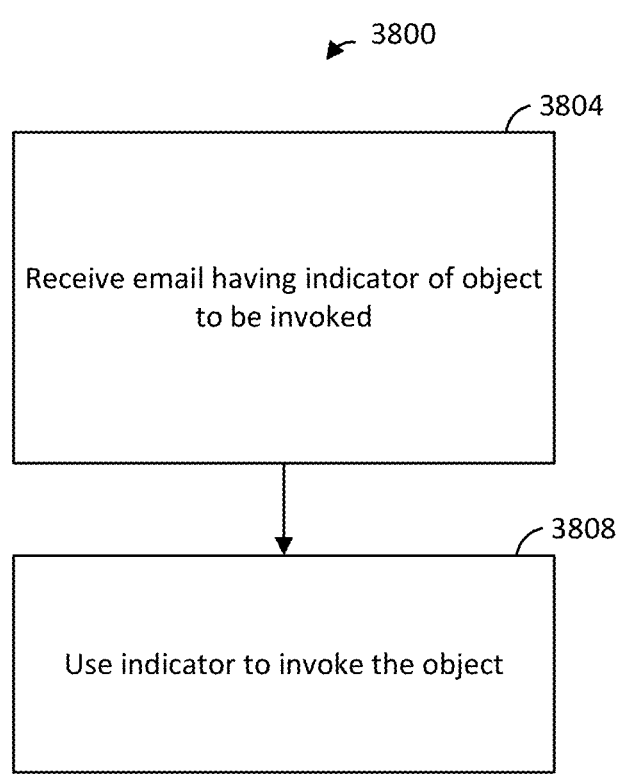
FIG. 12 is a flow diagram of an example method for processing an email message with a function deployed to network accessible storage, according to an embodiment.

FIG. 12 is a flow diagram of an example method 3800 for invoking an executable object in response to an email, according to an embodiment. The method 3800 may be implemented in the system 100 of FIG. 1, in some embodiments, and the method 3800 is discussed with reference to FIG. 1 merely for explanatory purposes. In other embodiments, the method 3800 is implemented in another suitable system. Similarly, in some embodiments, the system 100 does not implement the method 3800, but rather implements another suitable method for invoking executable objects in response to emails.

At block 3804, an email is received, where the email includes an indicator of an executable object to be invoked. For example, in some embodiments, the email server 194 may receive an email message with a specific "to" address corresponding to a deployed executable object. As merely an illustrative example, the email server 194 may recognize a base email address as generally corresponding to invoking an executable object, and an extension to the base email address as indicating the particular executable object that is to be invoked, according to an illustrative embodiment. For example, the email address may be a base text string+a short URL corresponding to the deployed executable object, according to an embodiment.

As another example, the email server 194 may receive an email message with the unique ID in the subject line of the email, according to an embodiment. As another example, the email server 194 may receive an email message with the unique ID in the content of the email, according to an embodiment.

At block 3808, the corresponding executable object is invoked using the indicator in email received at block 3804. For example, in some embodiments, the email server 194 may be configured to determine an extension to a base email address as indicating the particular executable object that is to be invoked, and then invoke the executable object corresponding to the extension. As another example, in some embodiments, the email server 194 may be configured to determine a subject of the email as including an indicator of the particular executable object that is to be invoked, and then invoke the executable object corresponding to the indicator. For example, the subject of the email may include a unique ID corresponding to the executable object, and the email server 194 may be configured to analyze the subject of the email to identify the unique ID, in an embodiment. As yet another example, in some embodiments, the email server 194 may be configured to determine body of the email as including an indicator of the particular executable object that is to be invoked, and then invoke the executable object corresponding to the indicator. For example, the body of the email may include a unique ID flagged with a reserved combination of alphanumeric characters, a keyword, etc., and the email server 194 may be configured to analyze the subject of the email to identify the unique ID, according to various embodiments.

In some embodiments, invoking the executable object may include utilizing the unique ID. For example, in some embodiments, the unique ID may correspond to a URL (e.g., short, long, etc.), and the email (or a portion of the email (e.g., one or more of the body of the email, a sender email address, a reply to address, etc.) may be provided to the URL using the Hypertext Transfer Protocol (HTTP). In various embodiments, the email server 194 may invoke and pass email information to the executable object using a technique such as the Simple Object Access Protocol (SOAP), the SOAP with Attachments (SwA) protocol, the JavaScript Object Notation for Remote Procedure Call (JSON-RPC) protocol, the Extensible Markup Language for Remote Procedure Call (XML-RPC) protocol, etc., or another suitable technique.

Upon being invoked, the executable object may process information from the email message. For example, a programmer may design the executable object to perform sophisticated email filtering and to forward emails to selected different email addresses based on the email filter processing, in an illustrative embodiment. As another example, a programmer may design the executable object to perform sophisticated spam filtering and to forward emails to selected different email addresses based on the email filter processing, in an illustrative embodiment. As another example, a programmer may design the executable object to perform sophisticated spam filter training, in an illustrative embodiment. As another example, a programmer may design the executable object to gather statistics or metrics on received emails, in an illustrative embodiment. As another example, a user may utilize the system for information gathering and processing, in an embodiment. For instance, a programmer may design the executable object to process data provided in emails and to store processing results, in an illustrative embodiment. In some embodiments, this may provide a convenient manner for gathering, receiving, and/or processing information in lieu of web-based forms, for example. As a specific example, programmer may design the executable object to perform image processing operations on images provided in (or attached to) emails and to store the image processing results, in an illustrative embodiment. In some embodiments, the system may utilize techniques described in U.S. patent application Ser. No. 14/872,129 for storing processing results, retrieving already stored data, etc. U.S. patent application Ser. No. 14/872,129, filed on Sep. 20, 2015, entitled "Cloud Storage Methods and Systems," is hereby incorporated by reference.

In some embodiments, the system 100 and/or the executable object may be designed to cause the email server 194 (or another email server, not shown) to send a reply email and/or acknowledgment email in response to the email server 194 receiving an email message, in response to the executable object being invoked, etc. For example, the executable object may process the email to determine the "from" or "reply to" address in the email message, and then instruct the email server 194 (or another email server, not shown) to send another email message to the "from" or "reply to" address. The content of the email message sent to the "from" or "reply to" address by the email server 194 (or another email server, not shown) may be specified by the executable object, in some embodiments. Alternatively, the content of the email message sent to the "from" or "reply to" address by the email server 194 (or another email server, not shown) may be a default message of the system 100, in some embodiments.

A variety of different levels and types of developer tools may be included in the system 100 to assist the user in creating executable objects and/or configuring executable objects for invocation by an email message. For example, a GUI may assist the user, provide default configurations, etc., for example, as described elsewhere herein with respect to the system 100.

In various embodiments, functions describe herein can be modified, omitted, combined with other functions, etc. For example, CloudDeploy and MailReceiverFunction are combined into single function, in an embodiment.

In another embodiment, a method includes: receiving, at one or more computers, programmer input in a programming language, the programmer input i) specifying a function to be performed by one or more computers, and ii) specifying that the function is to be applied by one or more computers to one or more electronic messages. The method further comprises at least one of: i) applying, at one or more computers, the function to one or more electronic messages indicated by the programmer input, and ii) generating, with one or more computers, an executable electronic object corresponding to the function, wherein the executable electronic object is generated such that the executable electronic object is configured to, when invoked, cause one or more computers to apply the function to one or more electronic messages.

In other embodiments, the method further includes one of, or any suitable combination of two or more of, the following features.

The method further includes: receiving, at one or more computers an electronic message with a destination address corresponding to the executable electronic object; and in response to receiving the electronic message with the destination address corresponding to the executable electronic object, invoking, with one or more computers, the executable electronic object so that the function is applied to the received electronic message.

The method further includes: receiving, at one or more computers, an electronic message from a server (e.g., an email server) via a network; and in response to receiving the electronic message invoking, with one or more computers, the executable electronic object so that the function is applied to the received electronic message.

The electronic message is an email message; and the destination address is an email address.

The programmer input includes a keyword, defined by the programming language, that specifies that the function is to be applied by one or more computers to one or more electronic messages.

The programmer input further includes a parameter that indicates one or more electronic messages to which the function is to be applied; and the method further comprises: applying, at one or more computers, the function to the one or more electronic messages indicated by the parameter.

In other embodiments, a system comprises: one or more processors; and one or more memory devices coupled to the one or more processors. The one or more memory devices store machine readable instructions that, when executed by the one or more processors, cause the one or more processors to perform one or more of the methods described above.

In still other embodiments, a tangible, non-transitory computer readable medium, or media, stores machine readable instruction that, when executed by the one or more processors, cause the one or more processors to perform one or more of the methods described above.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or the phrase "in an embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an ASIC, a programmable logic device, etc. When implemented utilizing a processor executing software or firmware instructions, the software or firmware instructions may be stored in any tangible, non-transitory computer readable medium, or media, such as a magnetic disk, an optical disk, a tape drive, a RAM, a ROM, a flash memory, a memory of a processor, etc. Likewise, the software or firmware instructions may be delivered to a user or a system via any known or desired delivery method including, for example, on a tangible, non-transitory computer readable medium or media, or via communication media. The software or firmware instructions may include machine readable instructions that, when executed by the processor, cause the processor to perform various acts.

Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method, comprising:
 receiving, at one or more computers, programmer input in a programming language, the programmer input defining a behavior of an executable electronic object configured to (i) be invoked by electronic email messages having an identifier corresponding to the executable electronic object and (ii) process the electronic email messages having the identifier;
 generating, at the one or more computers, the executable electronic object according to the programmer input;

receiving, at the one or more computers, an electronic email message having the identifier included in the electronic email message, the identifier corresponding to invoking the executable electronic object on the electronic email message, wherein the identifier is included in a destination address of the electronic email message, a base email address of the destination address corresponds to invoking an executable object, and an extension to the base email address identifies the particular executable electronic object; and in response to receiving the electronic email message having the identifier, invoking the executable electronic object according to the identifier by the one or more computers to process the electronic email message.

2. The method of claim 1, further comprising:
using, at the one or more computers, the programmer input to deploy the executable electronic object to network accessible storage.

3. The method of claim 1, further comprising:
generating, at the one or more computers, the identifier to facilitate invoking the executable electronic object using the identifier.

4. The method of claim 1, wherein invoking the executable electronic object according to the identifier comprises identifying the executable electronic object using the identifier as a unique ID that indexes the executable electronic object in a database.

5. The method of claim 1, wherein invoking the executable electronic object according to the identifier comprises invoking the executable electronic object on an attachment to the electronic email message.

6. The method of claim 1, further comprising:
sending a reply electronic email message to a sender of the received electronic email message, the reply electronic email message including content specified by the invoked executable electronic object.

7. A system, comprising:
one or more processors; and
one or more memory devices coupled to the one or more processors, the one or more memory devices storing machine readable instructions that, when executed by the one or more processors, cause the one or more processors to:
receive programmer input in a programming language, the programmer input defining a behavior of an executable electronic object configured to (i) be invoked by electronic email messages having an identifier corresponding to the executable electronic object and (ii) process the electronic email messages having the identifier,
generate the executable electronic object according to the programmer input,
receive an electronic email message having an identifier included in the electronic email message, the identifier corresponding to invoking the executable electronic object, wherein the identifier is included in a destination address of the electronic email message, a base email address of the destination address corresponds to invoking an executable object, and an extension to the base email address identifies the particular executable electronic object, and
in response to receiving the electronic email message, invoke the executable electronic object according to the identifier to process the electronic email message.

8. The system of claim 7, wherein the one or more memory devices further store machine readable instructions that, when executed by the one or more processors, cause the one or more processors to use the programmer input to deploy the executable electronic object to network accessible storage.

9. The system of claim 7, wherein the one or more memory devices further store machine readable instructions that, when executed by the one or more processors, cause the one or more processors to generate the identifier to facilitate invoking the executable electronic object using the identifier.

10. A tangible, non-transitory computer readable medium, or media, storing machine readable instruction that, when executed by the one or more processors, cause the one or more processors to:
receive programmer input in a programming language, the programmer input defining a behavior of an executable electronic object configured to (i) be invoked by electronic email messages having an identifier corresponding to the executable electronic object and (ii) process the electronic email messages having the identifier;
generate the executable electronic object according to the programmer input;
receive an electronic email message having the identifier included in the electronic email message, the identifier corresponding to invoking the executable electronic object, wherein the identifier is included in a destination address of the electronic email message, a base email address of the destination address corresponds to invoking an executable object, and an extension to the base email address identifies the particular executable electronic object, and
in response to receiving the electronic email message having the identifier, invoke the executable electronic object according to the identifier to process the electronic email message.

11. The computer readable medium, or media, of claim 10, further storing machine readable instructions that, when executed by the one or more processors, cause the one or more processors to use the programmer input to deploy the executable electronic object to network accessible storage.

12. The computer readable medium, or media, of claim 10, wherein the computer readable medium, or media, further store machine readable instructions that, when executed by the one or more processors, cause the one or more processors to:
cause the one or more processors to generate the identifier to facilitate invoking the executable electronic object using the identifier.

13. A method, comprising:
receiving, at one or more computers, programmer input in a programming language, the programmer input
specifying a function to be performed by the one or more computers, and
specifying that the function is to be applied by the one or more computers to one or more electronic email messages having an identifier corresponding to an executable electronic object;
wherein the method further comprises:
i) applying, at the one or more computers, the function to one or more electronic email messages having the identifier indicated by the programmer input, and
ii) generating, with the one or more computers, an executable electronic object corresponding to the function, wherein the executable electronic object is generated such that the executable electronic object is configured to, when invoked, cause the one or more computers to apply the function to one or more electronic email messages having the identifier;

receiving, at the one or more computers an electronic email message with a destination address that contains the identifier corresponding to the executable electronic object, wherein a base email address of the destination address corresponds to invoking an executable object, and an extension to the base email address identifies the particular executable electronic object; and in response to receiving the electronic email message with the destination address that contains the identifier corresponding to the executable electronic object, invoking, with the one or more computers, the executable electronic object so that the function is applied to the received electronic email message.

14. The method of claim 13, wherein:

the programmer input includes a keyword, defined by the programming language, that specifies that the function is to be applied by the one or more computers to one or more electronic email messages.

15. The method of claim 13, wherein:

the programmer input further includes a parameter that indicates one or more electronic email messages to which the function is to be applied; and the method further comprises:

applying, at the one or more computers, the function to the one or more electronic email messages indicated by the parameter.

* * * * *